United States Patent [19]

Riley et al.

[11] Patent Number: 4,601,655

[45] Date of Patent: Jul. 22, 1986

[54] HEATING APPARATUS

[75] Inventors: Eric K. Riley, West Midlands; Roger Dudill, Crewe; Philip J. Young, Whitchurch, all of England

[73] Assignee: Air Products and Chemicals, Inc., Allentown, Pa.

[21] Appl. No.: 662,852

[22] Filed: Oct. 22, 1984

[30] Foreign Application Priority Data

Oct. 21, 1983 [GB] United Kingdom ............... 8328265
Aug. 31, 1984 [GB] United Kingdom ............... 8422112

[51] Int. Cl.$^4$ ................................ F23J 5/02
[52] U.S. Cl. ................................ 431/116; 126/91 A
[58] Field of Search ............ 126/91 A; 431/115, 116

[56] References Cited

U.S. PATENT DOCUMENTS 2,918,117 12/1959 Griffin .................. 431/116
4,004,875 1/1977 Zink et al. ............. 431/187
4,380,429 4/1983 LaHaye et al. .......... 431/115

FOREIGN PATENT DOCUMENTS

69932 6/1978 Japan ................... 126/91 A

Primary Examiner—Carroll B. Dority, Jr.
Attorney, Agent, or Firm—James C. Simmons; E. Eugene Innis

[57] ABSTRACT

Oxygen is introduced through oxygen supply line (5) into an annular gallery (6) which it leaves at high velocity through annular channel (7). The outlet of the annular channel (7) is shaped so that, by virtue of the Coanda effect, the oxygen travels towards the downstream end of the burner (1) substantially parallel to the wall of the tubular body (2). Combustion gas from combustion chamber (13) is induced between support bars (4) into the tubular body (2) by the flow of oxygen and mixes with the oxygen and subsequently with natural gas introduced through fuel supply line (8). The mixture burns at the outlet (9) of the fuel supply line (8). The maximum temperature reached by the gas leaving the burner (1) is substantially lower than that which would be obtained by a conventional oxy-fuel flame. The burner may be used in radiant tubes.

4 Claims, 9 Drawing Figures

HEATING APPARATUS

This invention relates to heating apparatus.

It is well known in burner technology that substantial fuel savings can be made by replacing combustion air with oxygen or oxygen enriched air. However, the temperature of the oxy-fuel flame produced is considerably higher than that of the corresponding air-fuel flame. Whilst this phenomena is advantageous for many processes this additional temperature can be disadvantageous in other processes. Thus, oxy-fuel flames can produce localised overheating of products and refractories and, indeed, the use of oxy-fuel burners can result in poor temperature distribution within the furnace being heated.

The object of at least preferred embodiments of the present invention is to provide heating apparatus which can operate on fuel and oxygen or oxygen enriched air and which is so designed that the highest temperature of the combustion gas is lower than that which would be applicable to a conventional oxy-fuel burner.

According to the present invention there is provided a heating apparatus which comprises a burner and a combustion chamber, wherein said burner comprises a first portion in which, in use, combustion gases from the or another combustion chamber are mixed with one of (a) fuel; and (b) oxygen or oxygen enriched air, a second portion in which, in use, the mixture leaving said first portion is mixed with the other of (a) said fuel and (b) sid oxygen or oxygen enriched air; and means for igniting said mixture leaving said second portion to produce combustion gases in said combustion chamber.

Preferably, said first portion of said burner comprises a tubular body which is provided with one or more generally radially extending orifices for introducing fuel or oxygen or oxygen enriched air into the interior of said tubular body. In such an embodiment the orifices preferably together form a continuous channel. Preferably, the downstream side of the orifices is shaped so that as the gas leaves the orifices it flows towards said second portion of said burner. Advantageously, the tubular body includes a gallery which communicates with said generally radially extending orifices and with a supply line.

Preferably, the second portion is tubular and includes a line which has a plurality of outlets within the confines of said second portion for introducing fuel radially into said second portion.

Preferably the first portion of the burner comprises a support member by which the burner is secured to a wall of the combustion chamber. Such support can comprise, for example, four support bars or a single perforated cylindrical member.

In one embodiment of the invention, the combustion chamber comprises the inside of a furnace to which the sole supply of oxygen is via said heating apparatus.

In another embodiment of the invention, the combustion chamber is generally U-shape having first and second legs, said second portion of said burner is mounted on the first leg of said 'U' in alignment therewith, and said first portion of said burner is mounted between the second leg of said 'U' and said second portion of said burner. In this embodiment, preferably, the second portion of said burner is of generally circular cross-section. Advantageously, the first portion of said burner enters said second portion of said burner substantially tangentially. Preferably, the second portion of said burner comprises a fuel supply line which extends along the axis of said second portion and is provided with a plurality of radial outlets, and wherein a substantially circular disc is mounted at the downstream extremity of said fuel supply line. Advantageously, the combustion chamber is of generally circular cross-section and said first portion of said burner opens tangentially into said second leg of said combustion chamber. Preferably, said second leg is provided with a baffle for use during start-up, said baffle having a start-up position in which ambient air can be drawn into the first portion of said burner, and an operating position in which only combustion gases from the combustion chamber can be drawn into said first portion.

In a further embodiment of the invention, the combustion chamber is substantially link shaped having a first leg, a second leg substantially parallel to said first leg, a first end joining one end of said first leg with the adjacent end of said second leg, and a second end connected to the other end of said second leg and opening substantially in line with said first leg, and wherein said first portion and said second portion of said burner are aligned and are disposed between the inlet of said first leg and the outlet of said second end.

In yet another embodiment of the invention, the combustion chambers comprise substantially straight tubes, a burner is aligned with each such tube, and means are provided for conveying the combustion gases from the combustion chamber associated with one burner to the first portion of another burner.

For a better understanding of the invention reference will now be made, by way of example, to the accompanying drawings in which.

Figure 1:
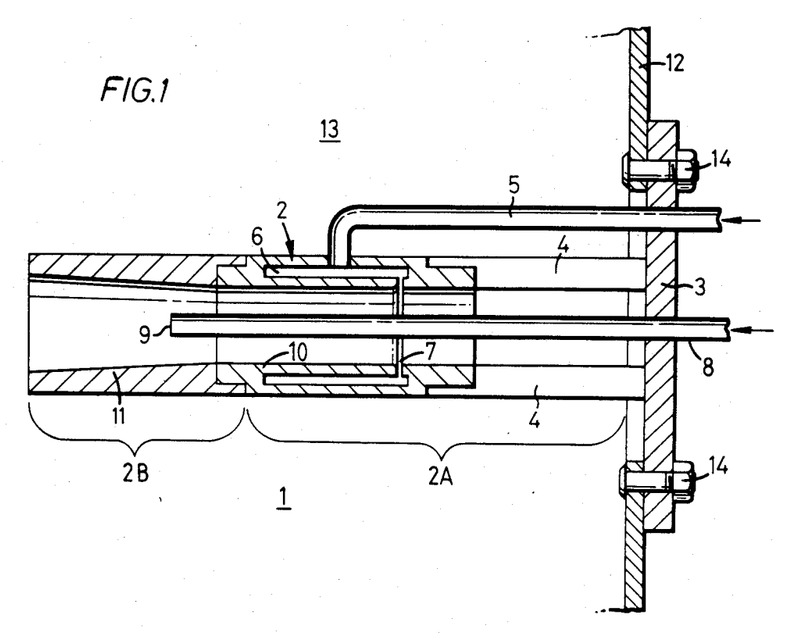
FIG. 1 shows a schematic vertical cross-section through part of a heating apparatus in accordance with the invention.

Referring to FIG. 1 of the drawings, there is shown a heating apparatus which comprises a burner 1 and a combustion chamber 13. The burner 1 comprises a first portion 2A and a second portion 2B. The first portion 2A comprises a tubular body 2, a plate 3 and, four circumferentially spaced support bars 4 which connect the tubular body 2 to the plate 3.

An oxygen supply line 5 passes through the plate 3 and communicates with an annular gallery 6 in the tubular body 2. An annular channel 7 extends between the annular gallery 6 and the inside of the tubular body 2 as shown.

A fuel supply line 8 passes through the plate 3 and extends axially of the burner 1 to outlet 9.

The tubular body 2 comprises a stainless steel circular cylindrical portion 10 which is connected to the second portion 2B which comprises a ceramic tip portion 11 which diverges away from the outlet 9 of the fuel supply line 8. As shown, the tip portion 11 and the circular cylindrical portion 10 are formed by two separate parts which are subsequently joined together. However, they could conceivably be made as a single item from, for example, stainless steel or ceramic material.

The entire burner 1 is mounted on the wall 12 of the combustion chamber 13 by a multiplicity of fixing bolts 14, which pass through the plate 3.

In use, fuel, for example natural gas and oxygen are introduced repsectively through fuel supply line 8 and oxygen supply line 5. The oxygen passes through oxygen supply line 5 into the annular gallery 6 which it leaves, at high velocity, through annular channel 7. The downstream-edge of the outlet of the annular channel 7 is rounded so that, due to the Coanda effect, the flow of oxygen bends substantially parallel to the tubular body 2. It then mixes with combustion gases from the combustion chamber 13 (which has entered from between the support bars 4) and subsequently with the fuel. The mixture is ignited by a pilot light (not shown) and burns downstream of outlet 9.

It will be appreciated that the presence of the combustion gases (which are induced into the tubular body 2 by the flow of oxygen) reduces the maximum temperature which the gas leaving the outlet of the tip portion 11 of the burner can obtain and thereby reduces the problems discussed hereinbefore. For the avoidance of doubt, oxygen supply line 5 is the sole source of combustion oxygen to the heating apparatus.

In general, the ratio of oxygen to fuel supplied to the burners will be set to be substantially stoichromatic and the volume of combustion gases recirculated adjusted until the flame temperature reaches the desired level. The volume of combustion gases recirculated may be varied by, for example adjusting the width of the annular channel 7 or restricting the flow of combustion gases into the upstream end of the burner 1 by, for example a baffle.

Various modifications to the arrangement described are envisaged. For example, the fuel could be introduced through oxygen supply line 5 and the oxygen (or oxygen enriched air) introduced through fuel supply line 8. However, this is not usually a practical alternative since fuel gas is normally only available at low pressure (typically 20 mbar gauge) whilst oxygen is typically available from liquid oxygen at 10 bar gauge. As described, the preferred fuel is gaseous, for example natural gas, propane and butane. However, the fuel could also be in liquid or solid form (e.g. pulverised coal). As described, the tubular body 2 is of circular cross section. However, this is not essential. Furthermore, the tubular body 2 could be water cooled if desired.

If desired, the support bars 4 could be replaced by a perforated cylindrical member.

The position of the outlet 9 of the tube 8 may be varied with respect to the tubular body 2. Thus, whilst the outlet 9 is preferably disposed as shown it could conceivably be disposed at the entrance to the tubular body 2 or in the plane of the annular channel 7.

The burner is particularly, but not exclusively, intended for use in radiant tubes which, heretofore, have not been susceptible to the use of oxy-fuel flames.

It will be appreciated that the combustion space 13 could be, for example, the inside of a radiant tube or the interior of a furnace.

Whilst it is highly desirable to use the Coanda effect as shown it is anticipated that an inferior, but nevertheless workable, arrangement could be made by introducing the oxygen or fuel from line 5 into the tubular body 2 via one or more passages inclined towards the downstream end of the tubular body 2.

Figure 2:
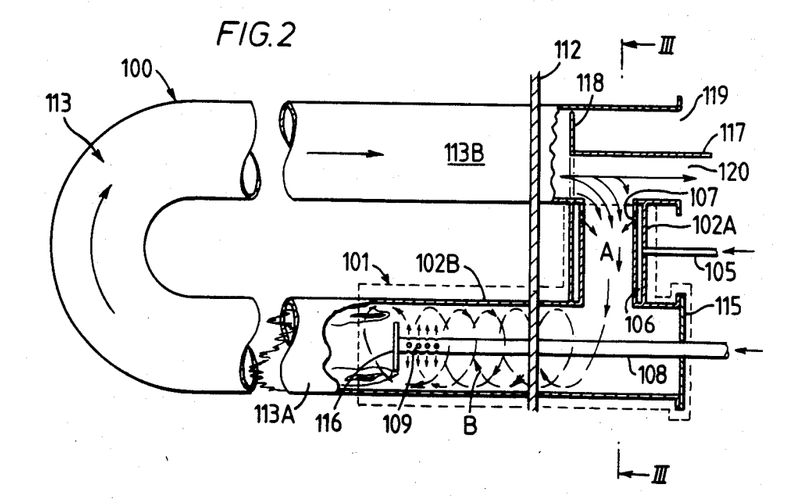
FIG. 2 is a side elevation, with parts cut away, of a second embodiment of heating apparatus in accordance with the invention.

Referring now to FIG. 2, there is shown a radiant tube which is generally identified by reference numeral 100. The radiant tube 100 comprises a burner 101 which is contained within the area bounded by chain dotted lines and a generally U-shape, combustion chamber 113. The burner 101 comprises a tubular body which is divided into a first portion 102A and a second portion 102B. An oxygen supply line 105 communicates with an annular gallery 106 in the first portion 102A of the tubular body. An annular channel 107 extends between the annular gallery 106 and the inside of the first portion 102A of the tubular body as shown.

Figure 3:
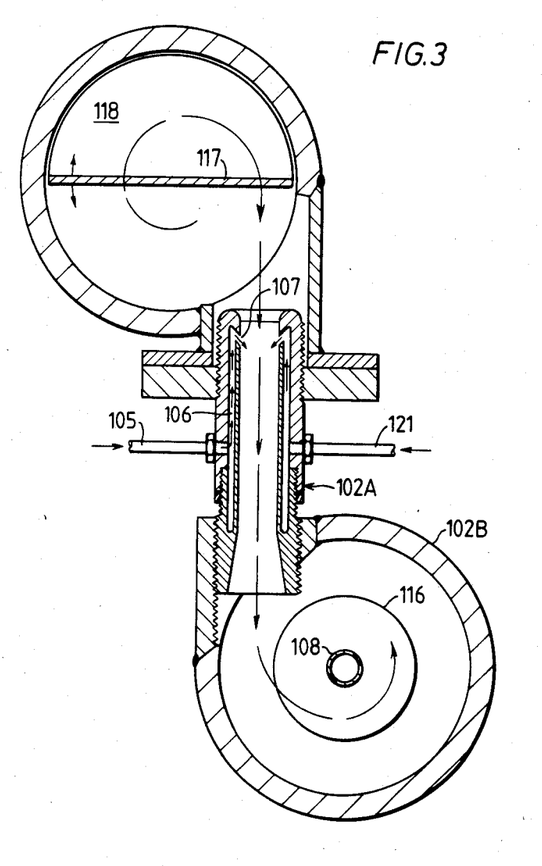
FIG. 3 is a view taken on line III—III of FIG. 2.

As can be seen from FIG. 3, the first portion 102A of the tubular body enters the second portion 102B tangentially. A fuel supply line 108 passes through a plate 115 and extends axially of the second portion 102B. The fuel supply line 108 terminates in a circular end plate 116 and is provided with a plurality of radially disposed outlet apertures 109 as shown.

The combustion chamber 113 comprises a first leg 113A and a second leg 113B. The outlet of the second leg 113B of the combustion chamber 113 is divided into two separate and distinct sections by a plate 117. A baffle 118 is mounted on one end of the plate 117 and both plate 117 and baffle 118 can be rotated between an operating position as shown in solid lines and a start-up position shown in chain dotted lines.

On start-up baffle 118 is moved to its start-up position, oxygen is then admitted through oxygen supply line 105 and, after passing through annular gallery 106 enters the inside of the first portion 102A of the tubular body via annular channel 107. The oxygen flows in the direction of the arrow A both by virtue of the inclination of the annular channel 107 and by virtue of the Coanda effect (the downstream edge of the outlet of the annular channel 107 being rounded). The oxygen entrains air from the atmosphere and the mixture enters the second portion 102B of the tubular body radially. It then swirls around the second portion 102B of the tubular body as indicated by the line B. As it passes along the second portion 102B it mixes with natural gas introduced radially through fuel supply line 108. The mixture passes end plate 116 and is then ignited by a pilot light (not shown). The mixture burns downstream of the circular end plate 116. The swirling combustion gases pass around the combustion chamber 113 and leave via exhaust outlet 119 (baffle 118 being in its second position).

Once combustion is established baffle 118 is returned to its operating position shown in FIG. 2. As baffle 118 is rotated the combustion gases pass through passageway 120. Part exit to the exhaust stack (not shown) whilst the balance is entrained into the first portion 102A of the tubular body by the flow of oxygen therethrough. The hot combustion gases dilute the oxygen and consequently reduce the maximum temperature which the flame can reach downstream of the circular end plate 116. At the same time the fact that the combustion gases are hot reduces the overall energy requirements. The proportion of combustion gases recycled is controlled by adjusting the width of the annular channel 107 as will be described hereinafter.

Typically, in a chrome-nickel radiant tube with a working temperature of 1300° C., the ratio of natural gas fuel to recirculated combustion gases is around 1:4 (by volume).

In the embodiment shown the first portion 102A of the burner is disposed outside of the furnace. However, if desired, the first portion 102A could conceivably be mounted inside the furnace wall 112.

On more general features, a nitrogen supply line 121 communicates with the annular gallery 106 and permits the entire system to be purged with nitrogen as and when required. It will also be noted that the first portion 102A of the tubular body also communicates tangentially with the outlet of the radiant tube 100.

Figure 4:
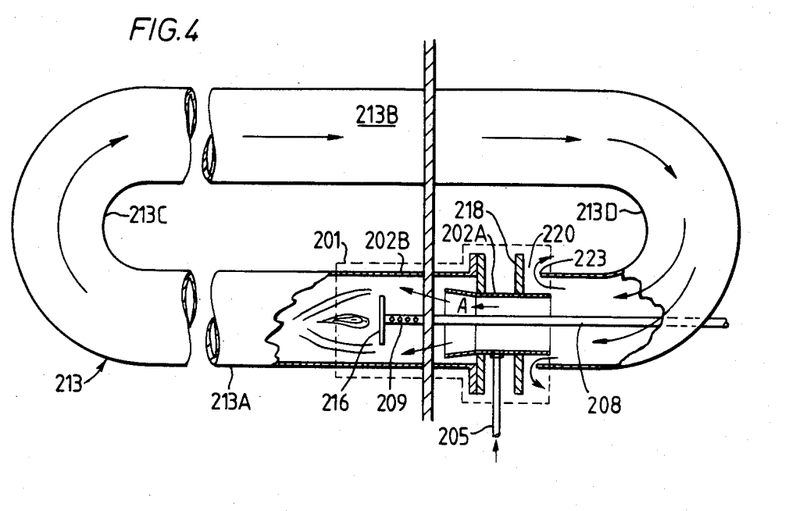
FIG. 4 is a side elevation, with parts cut away, of a third embodiment of heating apparatus in accordance with the invention.

Referring now to FIG. 4 there is shown an embodiment—which is, in principal, very similar to the embodiment shown in FIGS. 2 and 3. In this case the combustion chamber 213 is substantially link shaped having a first leg 213A, a second leg 213B substantially parallel to said first leg 213A, a first bend 213C joining one end of said first leg 213A with the adjacent end of said second leg, and a second bend 213D which is connected to the other end of said second leg 213B and opens substantially in line with the first leg 213A. In use, combustion gases pass through the combustion chamber 213 and are carried to an exhaust outlet 220 the size of which can be adjusted by moving a baffle 218 towards or away from the outlet 223 of the bend 213D as desired. Part of the gas leaves through the exhaust outlet 220 whilst the balance passes into the first portion 202A of a burner 201 which is contained within the area bound by chain dotted lines. The combustion gases are entrained into the first portion 202A by oxygen which is introduced through oxygen supply line 205 and whish passes in direction 'A' by the Coanda effect as hereinbefore described.

The mixed oxygen and combustion gases pass along the second portion 202B of the tubular body where they mix with natural gas supplied through fuel supply line 208 and which exits radially through outlet apertures 209. The mixture burns downstream of circular end plate 216 as shown.

In both the embodiments shown in FIGS. 2 and 3, and FIG. 4 the fuel supply line, and hence the outlet apertures and the circular end plate 216 can be moved axially of the tubular body.

Figure 5:
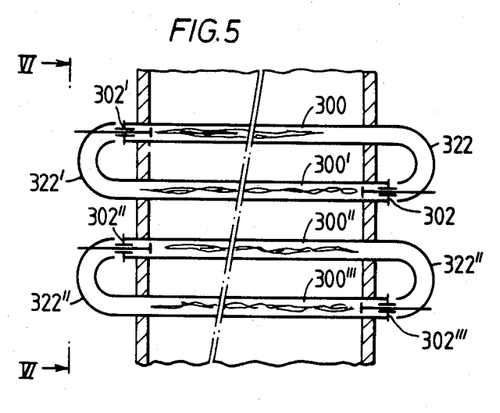
FIG. 5 is a simplified end elevation, with parts cut away, of a fourth embodiment of heating apparatus in accordance with the invention.

It will be noted that the radiant tubes described hereinbefore are all U-shape. FIG. 5 shows an embodiment in which the furnace is provided with a plurality of through radiant tubes 300, 300', 300" and 300'". In this embodiment the radiant tubes are connected in pairs. In particular, radiant tubes 300 and 300' are connected by U-shape bends 322 and 322' and radiant tubes 300" and 300'" are connected by U-shape bends 322" and 322'". Burner sections 302, 302', 302" and 302'" are mounted as shown so that each burner section is fed with exhaust from another burner section.

Figure 6:
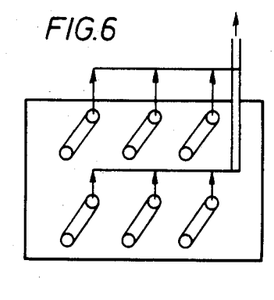
FIG. 6 is a simplified view taken along line VI—VI in FIG. 5.

FIG. 6 shows a multiplicity of radiant tubes connected in pairs as shown in FIG. 5. It will be appreciated that when commercially pure oxygen is used for combustion the cross-sectional area of the exhaust stack and ducting can be reduced by about 75%.

Various modifications to the embodiments described in FIGS. 2 to 6 are envisaged, for example, in FIGS. 5 and 6, the combustion gases from radiant tube 300" could be fed, in part, to the burner section 302 rather than to the burner section 302'", the burner section 302'" being fed with combustion gases from another source. Although the Coanda effect is preferred for mixing the oxygen and combustion gases and circulating the gases through the radiant tube, the section 102A could be replaced by a venturi or ejector device using the oxygen supply to accelerate the exhaust gases through the device.

The purity of the oxygen is not critical although clearly, the more nitrogen the oxygen contains the smaller the benefit over using air.

It will be noted that in FIGS. 1 and 2, the mixture of combustion gases and oxygen swirls around the second portion 102B. This tends to diffuse the flame and further reduce the formation of "hot spots".

Ideally, the relative volumes of fuel and oxygen admitted to the burner are substantially stoichometric and the volume of combustion gas recycled is that required to ensure that the radiant tube does not exceed its rated operating temperature, or the required furnace temperature of lower. It will, however, be recalled that the maximum proportion of combustion gases which can be recycled depends on the flamability limit of the oxygen/fuel/combustion gas mixture. The ratio of oxygen to combustion gas can be controlled by adjusting the width of annular channel 107. In this connection, if the fuel is methane, the width of annular channel 107 should preferably be set so that, in steady state operation, the ratio (by volume at STP) of exhaust gas entrained to oxygen admitted is less than 6.9:1 and preferably less than 6.3:1. Although other ratios are possible, this arrangement has the advantage of facilitating start-up.

Preliminary tests in a furnace using a single radiant 'U'-tube as shown in FIGS. 2 and 3 indicated that the amount of fuel required to maintain the furnace at 800° C. could be reduced by 43%. Further tests have indicated that fuel savings in excess of 50% are quite feasible.

Figure 7:
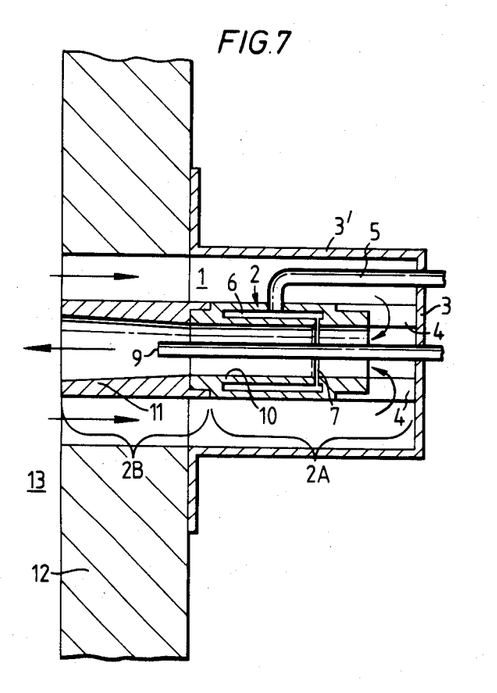
FIG. 7 is a schematic vertical cross-section through part of a fifth embodiment of heating apparatus in accordance with the invention.

FIG. 7 shows an embodiment which is generally similar to that shown in FIG. 1 except that the outlet of the burner 1 is flush with the inside of the wall 12 of the combustion chamber 13. The upstream end of the burner 1 is housed in a casing comprising an end plate 3 and a cylindrical plate 3' secured to the wall 12 by bolts (not shown). In use, hot combustion gases pass along the outside of the tubular body 2 and are drawn into the upstream end of the burner 1.

Figure 8:
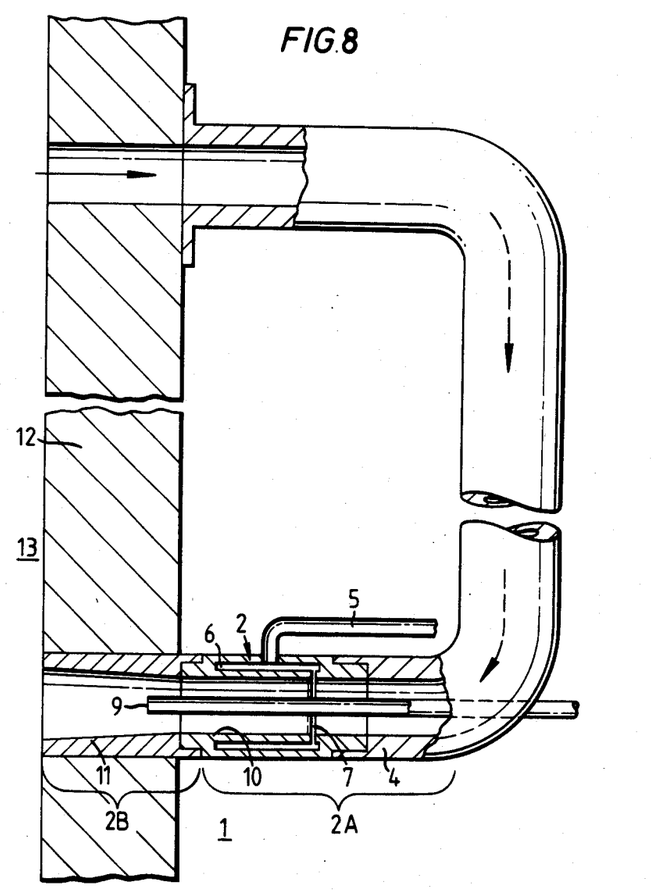
FIG. 8 is a schematic vertical cross-section through part of a sixth embodiment of heating apparatus in accordance with the invention.

FIG. 8 shows an embodiment similar to that shown in FIG. 7 except that the combustion gases are returned via a pipe which conveys combustion gases from a remote part of the combustion chamber 13 to the upstream end of the burner 1. This embodiment is particularly advantageous in so far as a correctly positioned pipe can greatly facilitate mixing and thereby obtaining an even distribution of heat through the combustion chamber 13.

Figure 9:
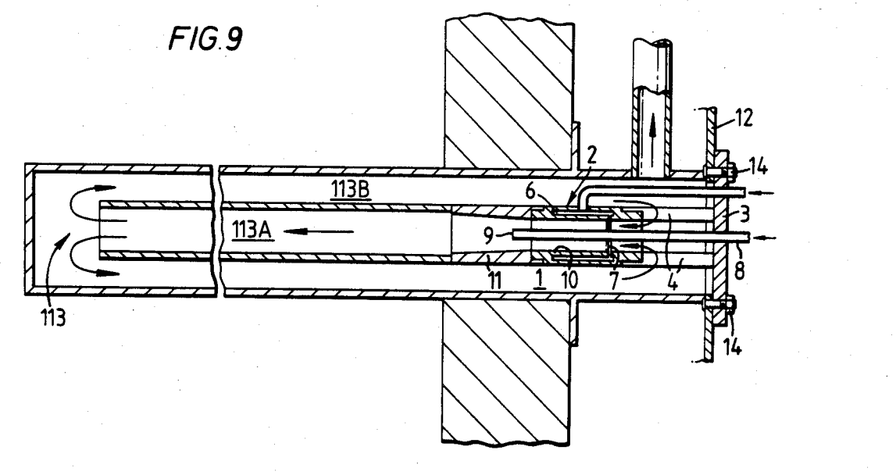
FIG. 9 is a schematic vertical cross-section through part of a seventh embodiment of heating apparatus in accordance with the invention.

FIG. 9 shows the burner 1 incorporated in a single ended radiant tube. In particular, the combustion gases pass along the first leg 113A of the combustion chamber 113 and then return along the second leg 113B. Part of the combustion gases are drawn into the upstream end of the burner 1 whilst the balance passes through the exhaust.

We claim:

1. An oxy-fuel burner comprising in combination;
means for mounting said burner to a device to be heated such as a combustion chamber;
a cylindrical first burner portion open at opposite ends and fixed to said mounting means in a manner to permit the atmosphere in said device to be heated to circulate behind said first burner portion and into an open end, said first burner portion including Coanada effect opening means located between said opposite ends to inject oxygen into the interior of said first burner portion to cause entrainment of said atmosphere in said oxygen by means of the Coanda effect;
a second burner portion being generally cylindrical in shape, said second burner portion or tip fixed to said first burner portion so that the first and second burner portions form a continuous passage for said oxygen and entrained atmosphere, the interior passage of said second burner portion forming an outwardly diverging nozzle; and
means to inject fuel into the interior of said passage formed by said first and second burner portions to mix with said atmosphere and oxygen in said passage.

2. An oxy-fuel burner as claimed in claim 1, wherein said first portion of said burner comprises a support member.

3. An oxy-fuel burner as claimed in claim 2, wherein said support member comprises four support bars.

4. An oxy-fuel burner as claimed in claim 1, wherein said device to be heated comprises the inside of a furnace to which, in use, the sole supply of oxygen is via said oxy-fuel burner.

* * * * *